United States Patent [19]

Yoshida et al.

[11] Patent Number: 6,066,580

[45] Date of Patent: *May 23, 2000

[54] FIRE RETARDANT NOISE ABSORBING MATERIAL AND METHOD OF PRODUCING THE SAME

[75] Inventors: Tetsuo Yoshida; Tomotatsu Ogawa, both of Yokohama, Japan

[73] Assignee: Bridgestone Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/014,618

[22] Filed: Jan. 28, 1998

[30] Foreign Application Priority Data

Feb. 5, 1997 [JP] Japan ..................................... 9-022879
Feb. 5, 1997 [JP] Japan ..................................... 9-022880

[51] Int. Cl.$^7$ ............................... B32B 3/26; B32B 5/24; B32B 31/20

[52] U.S. Cl. ........................... 442/221; 156/77; 156/247; 156/309.6; 428/319.7; 428/319.9; 442/370

[58] Field of Search ..................................... 442/221, 370; 428/319.7, 319.9, 337; 156/77, 247, 309.6

[56] References Cited

U.S. PATENT DOCUMENTS 3,940,468  2/1976  Tunstall ............................ 428/319.7 X
4,671,992  6/1987  Lancaster et al. .................... 428/316.6
4,948,648  8/1990  Dadgar et al. ............................ 428/71
5,560,967  10/1996  Isaksen ..................................... 428/71

FOREIGN PATENT DOCUMENTS 61-53035  3/1986  Japan .

*Primary Examiner*—Blaine Copenheaver
*Attorney, Agent, or Firm*—Oliff & Berridge, PLC

[57] ABSTRACT

The present invention provides a fire retardant noise absorbing material, with excellent water proof properties, fire resistance, noise absorption, and improved tear resistance if necessary, and a method of producing the same efficiently in a short time in a simple and easy manner. The fire retardant noise absorbing material having gas permeability of a section of 10 mm in thickness from a surface of the film layer in the range of 5 to 80 ml/cm$^2$.sec, is produced following the steps of; superposing a polyester film or a polyethylene film onto fire retardant soft urethane foam; laminating a sheet of mold releasing paper thereon; heating the paper while pressure is applied thereto from the surface of the paper by means of a hot plate to affix the film layer on the fire retardant soft urethane foam by hot melting; removing the laminated material from the hot plate in a heated condition; and separating the mold releasing paper from the laminated material after the film has solidified. According to necessity, a resin fabric such as a nylon fabric is further laminated onto the film layer.

10 Claims, 4 Drawing Sheets

FIRE RETARDANT NOISE ABSORBING MATERIAL AND METHOD OF PRODUCING THE SAME

BACKGROUND OF THE INVENTION

1. Field of the Invention

The present invention relates to a noise absorbing material and a method of producing the same. More particularly, the present invention relates to a fire retardant noise absorbing material used in an engine room of a construction machine, an automobile or the like, with excellent waterproof properties, fire resistance, noise absorption, and improved tear resistance if necessary, and a method of producing the same with a small energy loss in a short time in a simple manner.

2. Description of the Related Art

Noise absorbing materials used for engine rooms of construction machines, automobiles, common outdoor articles, and the like require at least an improvement in waterproof properties, noise absorption in a low to medium frequency range, and fire resistance and there is a strong demand for a method of producing such noise absorbing materials with a small energy loss in a short time in a simple manner. While a gas permeability is conferred to a noise absorbing material in order to improve the noise absorption, they are permeated with water thereinto by rainfall and washing, and such water is hard to drain and is often accumulated therein, so that the noise absorption is reduced, it is faster for the material to deteriorate as well and as a result, durability thereof is reduced. Accordingly, there is a need for an improvement in waterproof properties. Fire resistance of noise absorbing materials can also be thought of as an indispensable property from the view point of the safety of a product using noise absorbing materials, regulations by law and the like. While fire retardant soft urethane foam is well known, it cannot satisfy the requirements of waterproof properties and noise absorption in a low to medium frequency range though it has sufficient fire resistance in cases where urethane foam is used alone. As a method for improving noise absorption in the range of low to medium frequency, there are known methods such as that disclosed in Japanese Patent Application Laid-Open (JP-A) No. 61-53035. This method is to improve noise absorption by a stacking plastic film with gas permeability using a hot melting technique on a common soft urethane. However, it is hard to obtain a fire retardant material with such a combination of flammable plastic film and flammable soft urethane. There is a common understanding that fire resistance is reduced in a combination of a flammable plastic film and fire-retardant soft urethane foam. Further, production of a noise absorbing material with specific gas permeability by hot melting is accompanied with various problems. For example, when a hot melt film is simply superimposed on a soft urethane foam and heat is applied on the film by a hot plate, the film sticks to the hot plate and thus affixing of the film on the urethane foam cannot be realized if the plate is separated from the urethane foam as soon as the hot melting of the film finishes. This phenomenon is caused by moving the hot plate, for example, upwardly or downwardly while the film is still in a molten condition. To cope with such problems, it is necessary to separate the noise absorbing material from the hot plate after the hot plate has cooled, that is after the film has solidified. Cooling after heating is a primitive method and to repeat heating and cooling of the heat plate is attended with great energy loss, inefficiency and time consumption.

As mentioned above, at the current level in conventional technology there is not known a method of producing a noise absorbing material which is excellent in properties of water proof, fire resistance, high noise absorption in a low to medium frequency range, and improved on tear resistance if necessary, with a small energy loss, in a short time in a simple manner.

SUMMARY OF THE INVENTION

The present invention has been made in light of the above mentioned facts and an object of the present invention is to provide a fire retardant noise absorbing material which has excellent waterproof properties, fire resistance, noise absorption and improved on tear resistance if necessary and to provide a method of producing the same efficiently in a simple manner.

The present inventors have carried out the research paying attention to a noise absorbing material composed of a fire retardant soft urethane foam and a stacked film layer in order to solve the above mentioned problem associated with properties of a noise absorbing material and as a result, new knowledge has been obtained in experiments on stacked materials in layers in combination of the fire retardant soft urethane foam and various kinds of films, namely, that while a stacked layer material composed of the urethane foam and a polyamide film or a polyurethane film, both flammable, burns as expected, a stacked layer material composed of the urethane foam and a polyester film or a polyethylene film is unexpectedly fire retardant and in addition has water proof properties and noise absorption. Moreover, the present inventors have studied coating a hot plate with a mold releasing agent and affixing a Teflon film with excellent mold releasing effects on the plate for preventing adhesion of a film to the hot plate, paying attention to a method of producing a noise absorbing material having a stacked layer structure composed of soft urethane foam and a film in order to solve the above mentioned problem, while the inventors have thought that the energy loss was small and the time period for affixing one with the other was short if the noise absorbing material was separated from the hot plate in a heated condition as a method for adhering a film efficiently in order to stack a film on a soft urethane foam in a layered manner and to have a specific gas permeability by hot melting, but the problem was not been able to be solved. The present inventors have for the first time gained sufficient knowledge to solve the problem, after various experiments resulting in the discovery that if a mold releasing paper is inserted in a stacking manner between the hot plate and the film of a noise absorbing material, the problem can be solved. That is, the present inventors found that the object of the present invention can be achieved by the following means and have completed a fire retardant noise absorbing material and a method of producing the same of the present invention.

A fire retardant noise absorbing material according to the present invention comprises: a fire retardant soft urethane foam; and a polyester film or a polyethylene film affixed by hot melting on one side of the urethane foam in a layered manner, in which a gas permeability of a portion of 10 mm in thickness from a surface of the film of the noise absorbing material is in the range of 5 to 80 ml/cm$^2$·sec.

A method of producing a fire retardant noise absorbing material of the present invention having gas permeability of a portion of 10 mm in thickness from a surface of a film in the range of 5 to 80 ml/cm$^2$·sec, comprises the steps of: superimposing the film on soft urethane foam; placing a sheet of mold releasing paper thereon in a stacking manner; heating them from the side of the paper by a hot plate while a pressure is applied to affix the film on the soft urethane foam by hot melting; taking out a laminated material from the hot plate in a heated condition; and separating the mold releasing paper from the laminated material after the film is solidified.

DESCRIPTION OF THE PREFERRED EMBODIMENTS

In the method of producing a noise absorbing material of the present invention, the fire retardant soft urethane foam may be any kind of soft urethane foam, as long as the soft urethane foam meets various kinds of standards or tests such as UL-94, HF-1, MVSS302, a void test, A—A standard and the like and for example, they are EVERLIGHT VHZ, VP, VD (trade names, made by Bridgestone CO.) or the like.

The thickness of each of these fire retardant soft urethane foams is in the range of 10 to 100 mm, or preferably in the range of 10 to 50 mm in consideration of applied fields.

As a film affixed to one surface of soft urethane foam in a laminating manner by hot melting, preferably, a polyester film or a polyethylene film is used, or more preferably, a polyester film or a polyethylene film, whose melting point is in the range of 80 to 160° C. and which does not require a hot-melt adhesive commonly used for adhesion of these films. Among them a polyester film is preferable. A film of a lower melting point is better in workability, since the film can be molten at the lower temperature. However, from the view point of product performance, a higher melting point is better since if the working temperature is higher, the film is subject to be in bad conditions, such as molten or peeled off. A majority of usage in terms of quantity is for a vehicle and in the case, a melting point of the film is preferred to be in the range of 100 to 130° C. Without a hot-melt adhesive, affixing the film on the urethane foam can be achieved by hot melting. Process steps are decreased and thereby economy is improved without any influence on either water proof properties or noise absorption, since no adhesive is required.

As a film used in the present invention, for example, named is a hot-melt film such as EVA, modified EVA, polyethylene, polypropylene, polyester, polyamide, polyurethane or the like and among them, a polyester film and a polyethylene film are preferable. The reason why is that if each is laminated on a fire retardant soft urethane foam, fire resistance is not reduced despite each film being flammable, in which the mechanism for the phenomenon is not clear. Accordingly the films are suitable for a fire retardant noise absorbing material. While a fire retardant noise absorbing material of the present invention has good water proof properties. In order to improve the water proof properties, other properties of films have been studied in the research leading to the present invention. As a result, it was found that a polyester film and a polyethylene film are both large in a contact angle with water, that is large in water repellency, which decreases water permeation into the bulk. This is the reason that the films have excellent water proof properties, which is one of the reasons why the films are preferable.

The thickness of both the polyester film and the polyethylene film used in the present invention is in the range of 10 to 100 μm, or preferably 15 to 50 μm in terms of an effect. When the thickness is less than 10 μm, workability in processing is worse, while when the thickness is more than 100 μm, it is not preferable in terms of cost.

Gas permeability in a portion of 10 mm in thickness from a film surface of a fire retardant noise absorbing material of the present invention is in the range of 5 to 80 ml/cm$^2$·sec, or preferably in the range of 10 to 25 ml/cm$^2$·sec in terms of an effect. When the gas permeability is less than 5 ml/cm$^2$·sec, its performance is analogous to a material which is laminated on a film that has no gas permeability. When the gas permeability is more than 80 ml/cm$^2$·sec, its performance is close to that of a foam without being laminated a film, and noise absorption is reduced, which is not preferable. In order to specify a gas permeability, a relation between the gas permeability and the noise absorption at various thickness of noise absorbing material was studied and as a result, it was found that gas permeability in a portion of 10 mm in thickness from a film surface especially has a close relation with an noise absorption in a low to medium frequency range. Such findings determine the numerical range of the gas permeability of the present invention.

As a mold releasing paper used in a producing method of the present invention, there is no specified requirement but, for example, a mold releasing paper or a mold releasing film with silicone coating on the surface thereof or the like can be named.

In a noise absorbing material produced by a production method of the present invention, when the film affixed by hot melting requires a high degree of tear resistance, resin fabric or resin nonwoven fabric having gas permeability of 5 ml/cm$^2$·sec or more on the surface of the film and flexibility is stacked to have a layered structure as a reinforcing material, whereby tear resistance can be increased by a great margin without any reduction in other properties thereof.

Resin fabric or resin nonwoven fabric used in the present invention is not specifically restrictive as far as each has gas permeability of 5 ml/cm$^2$·sec or more and flexibility. In this case, for example, fabric with gas permeability of 80 ml/cm$^2$·sec or more can be used. As the resin fabric or resin nonwoven fabric, nylon fabric or nylon nonwoven fabric is preferably used, respectively. As such resin fabrics, for example, nylon tricot 15d (counts; longitudinal 28, lateral 20, size 15d (denier), gas permeability 400 ml/cm$^2$·sec or more, a trade name nylon tricot 15d, made by Kiryu tricot Co.), nylon tricot 30d (counts; longitudinal 28, lateral 40, size 30d, gas permeability 400 ml/cm$^2$·sec or more, a trade name nylon tricot 30d, made by Kiryu tricot Co.) and the like can be named. As such resin nonwoven fabrics, for example, nylon nonwoven fabrics (METSUKE; 20 g/cm$^2$, gas permeability 400 ml/cm$^2$·sec or more), nylon nonwoven fabric (METSUKE; 30g/m$^2$, gas permeability 400 ml/cm$^2$·sec or more) and the like can be named.

Among the above mentioned resin fabrics and resin nonwoven fabrics, fine meshed fabrics (many counts, large size, large METSUKE and small gas permeability) have a large tear resistance (reinforcement) of the film. However, in the present circumstances, because high tear resistance is not required, such fabrics are expensive, and gas permeability is small such fabrics are disadvantageous from the view point of a fire retardance, whereas rough meshed fabrics (few counts, small size, small METSUKE, and large gas permeability) meet the required properties, are obtained at a low price, have large gas permeability and are advantageous from a view point of fire retardance. From the above consideration, nylon tricot 15d and nylon nonwoven fabric (METSUKE; 20 g/cm$^2$) are preferably used among the fabrics exemplified above.

While a fire retardant noise absorbing material of the present invention may be produced by any method which comprises a fire retardant soft urethane foam, a specified film and satisfies a specified gas permeability as mentioned above, a noise absorbing material provided by the present invention is produced with a low energy loss in a short time in a simple and easy manner in accordance with a producing method of the present invention, that comprises the steps of: laying a film on fire retardant soft urethane foam without application of a hot-melt adhesive; placing a sheet of mold releasing paper thereon in a stacking manner; heating the film from the mold releasing paper by hot plate while pressure is applied from the surface thereon; affixing the film on the soft urethane foam by hot-melting; taking out the stacked material with the sheet of mold releasing paper thereon from a hot plate, while the hot plate is in a heated condition; solidifying the film; and thereafter separating the sheet of mold releasing paper from the stacked material.

And in order to cope with a necessity, a method of producing fire retardant noise absorbing material can further comprise the steps of: stacking a resin fabric or a resin nonwoven fabric as a reinforcing material for the above mentioned film thereon in a stacked manner; placing a mold releasing paper thereon in a stacked manner; and conducting other steps as done in a similar manner to the above mentioned, whereby the reinforced noise absorbing material with a film can be produced. In this case, when a fine meshed resin fabric or fine meshed nonwoven resin fabric is used, the mold releasing paper may not necessarily be used since the film is not sticky on the hot plate in the majority of cases.

Figure 1:
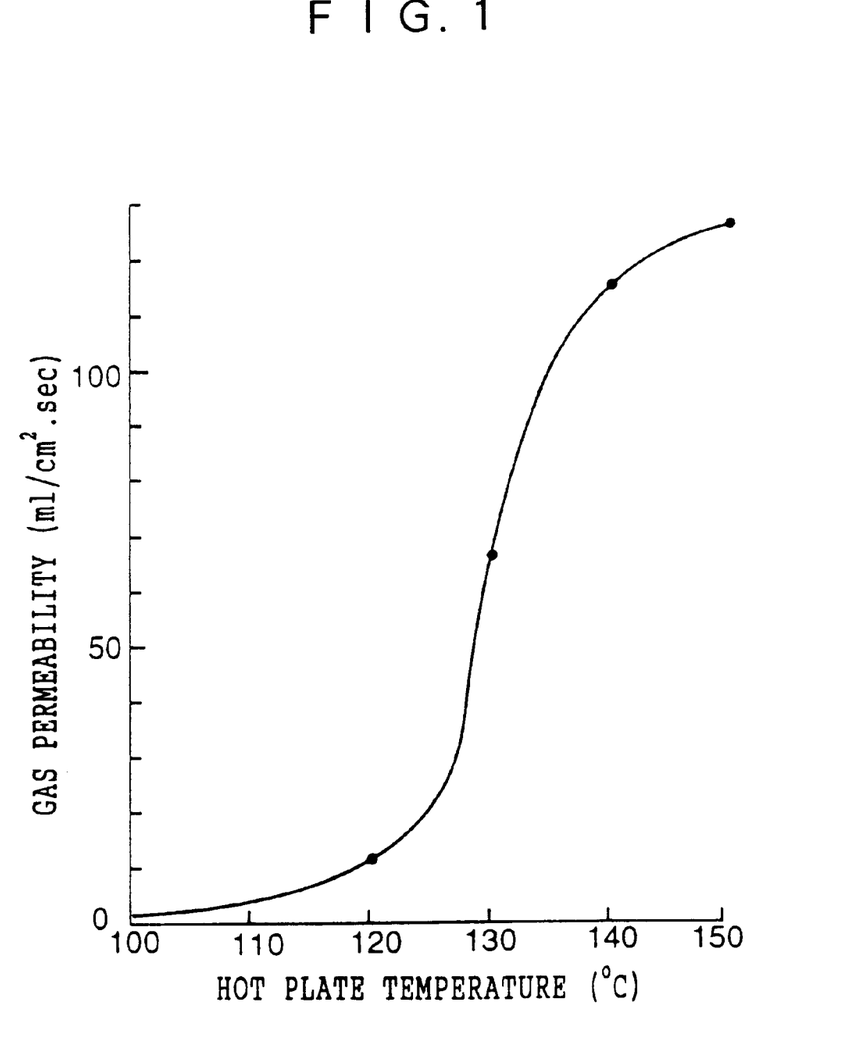
FIG. 1 is a graph showing a relation between the hot plate temperature of a molding compressor and the gas permeability of a noise absorbing material.

In this producing method, the temperature of the heating while pressure is applied is higher than the melting point of the film by 3° C. or more, or preferably in the range of 3 to 15° C. However, if the temperature is too high, it is not preferable from a consideration of an excessive degree of gas permeability. This heating temperature is the most influential factor to give large gas permeability to a film in a noise absorbing material. Gas permeability of a film does not increase, even if pressure for pressure-affixing between a soft urethane foam and the film is increased or the time period when the film is in a molten condition is lengthened. The heating temperature has a relation with the melting point of a film and thus it is required to consider the properties of each film in determination of the heating temperatures. For example, FIG. 1 a graph showing a relation between the hot plate temperature of a molding compressor and the gas permeability of a noise absorbing material when a polyester film (D 2810: trade name, made by Daicel Chemical Industries, Ltd., melting point 115° C.) as a film of a noise absorbing material is used. As shown in this Figure, it is found that as a temperature is raised, gas permeability is increased in the range of temperature of the hot plate of 120° C. or higher.

Since noise absorption increases in proportion to the gas permeability of noise absorbing material (though there is a limit to the increase of gas permeability of the noise absorbing material for improvement in noise absorption in a low to medium frequency range), gas permeability is necessary. For such a reason, the film of a noise absorbing material is necessary to have gas permeability. In order to realize gas permeability in a noise absorbing material of the present invention, a film is inserted in a stacking manner between a material having porous surface such as soft urethane foam and a mold releasing paper, the film is affixed to the foam by hot melting and the film is cooled to solidify, whereby holes are opened in the film on the uneven porous surface to confer gas permeability to the film.

In the production method of the present invention, a method in which a hot plate is disposed on the side of the soft urethane foam may be considered, but it is not preferable, since workability is deteriorated. However, if a press in which a continuous heating can be achieved is used, the problem associated with workability disappears. In the case where an operation is performed in a batch system, a dispersion of heating hours can be small and thus a quality of a product is better if a hot plate is disposed on the mold releasing paper side.

EXAMPLES

The present invention will be described below in specific examples, and it should be understood that the invention claimed in this application is not limited to the descriptions in the examples in so far as they do not go outside the gist of the present invention.

Various kinds of measurement are carried out by the following methods.

1) A method for Measuring Water Proof Properties

Figure 2:
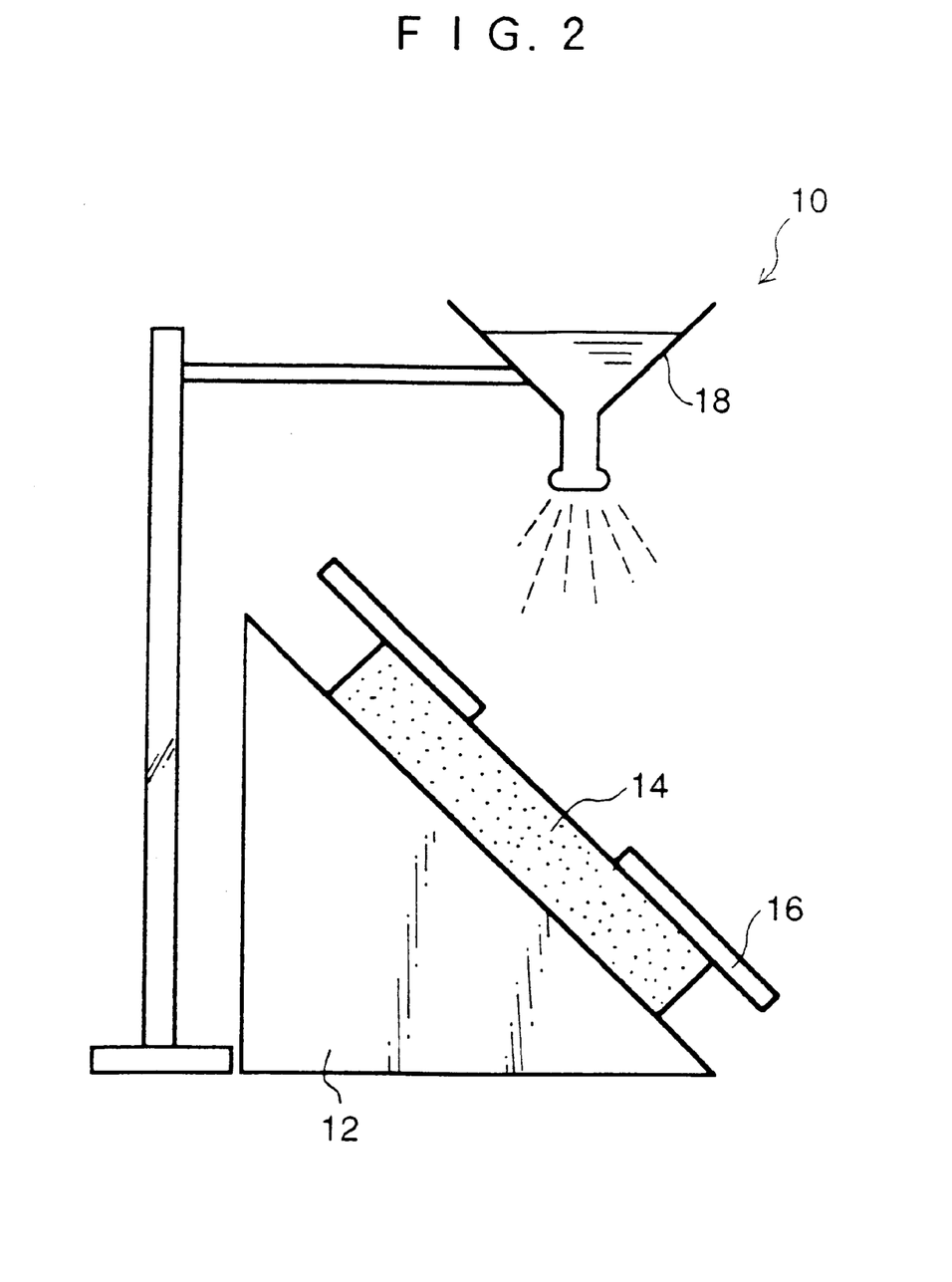
FIG. 2 is a schematic view of a water absorption measuring instrument.

The water proof properties prevent permeation of water. The amount of water absorption and contact angle of the films with water were used as representative properties therefor. The amount of water absorption was measured with the use of a water absorption measuring instrument 10 shown in FIG. 2. The method for measurement of the amount of water absorption comprises the steps of: affixing a noise absorbing material 14 on a support 12; covering a part of the noise absorbing material with a noise absorbing material cover 16; pouring predetermined quantity (500 ml) of water across an exposed circular part of the noise absorbing material with a predetermined area (80 mm in diameter) over one minute from a water sprayer 18; and measuring the amount of water absorption, and measurement of a contact angle is performed by use of a Kyowa made water contact angle measuring instrument based on a droplet method. The water proof properties are evaluated better as the amount of water absorption is smaller and then the contact angle between a film and water is larger.

2) A Measuring Method for Gas Permeability

Gas permeability in a portion of 10 mm in thickness from a film surface of a noise absorbing material was measured according to a method of JIS L 1096A.

3) A Measuring Method for Fire Resistance

This method is to observe a sample piece after a flame is applied on a surface of the sample piece for 60 sec and then the flame is taken away. Detailed conditions are different from one another by differences of various standards, but observation after the flame is taken away is important. A self-extinguishing property in this method is a property that a flame on the surface of a sample piece is put out when an applied flame is taken away and a delayed combustivity property is a property that a sample piece continues to combust after a flame is taken away.

4) A Measuring Method for Noise Absorption

A reverberation room method was used to measure the noise absorption rate in a frequency range of 200 to 5000 Hz.

The noise absorption rate α of the reverberation room method is calculated by the following formula.

$$\alpha = (4 \log_e 10^6/c) \times V/S \times 1(1/T_1 - 1/T_0)$$

where c represents an acoustic velocity, V represents a volume of a reverberation room V=9 m³, S represents a sample area S=1.2 m², $T_0$ represents a reverberation time in a vacant room, $T_1$ represents a reverberation time.

As measuring methods for noise absorption, a method of measurement of a normal incident sound absorption coefficient using a sound tube and a method of measurement of a reverberant sound absorption coefficient are available. Since an noise absorbing material with a film layered exhibits its own property of noise absorption by resonance and thereby measurement a normal incidence acoustic absorption lacks correctness, measurement of a reverberation room method acoustic absorption was adopted.

5) A Measuring Method for a Tear Resistance

A sample obtained by slicing off a portion of a thickness of 10 mm from a surface of a film was used for measurement according to procedures similar to JISK 6301.

(Example 1)

A molding compressor equipped with two hot plates, upper and lower, heated at 125° C., was used. A fire retardant soft urethane foam (VHZ trade name, made by Bridgestone Co.) having properties such as a density of 23 kg/m³, a hardness of 10 kgf, a thickness of 25 mm and gas permeability of 130 ml/cm²·sec was placed on the lower hot plate, a polyester film having a thickness of 30 μm and a contact angle of 66°(D2810 trade name, made by Daicel Chemical Industries, Ltd.) was stacked thereon in a layered manner, a sheet of mold releasing paper (SBK70J trade name, made by Lintec Co.) was further disposed thereon, stacked materials was heated at 125° C. for 90 sec under pressure by the hot plates with compressing to 20% deflection, the noise absorbing material with the sheet of mold releasing paper was taken away from the hot plates while the hot plates were still in a heated condition, the stacked material was left to cool down at room temperature, and thereafter the sheet of mold releasing paper was peeled off to obtain a noise absorbing material. The hot plates were not cooled and the above mentioned process steps were repeated to obtain another noise absorbing material. Properties of thus obtained noise absorbing material were subjected to measurements on various properties such as gas permeability, amount of water absorption, flame resistance and noise absorption rate, which are shown in Table 1.

(Example 2)

A noise absorbing material was obtained in a similar way to that in the Example 1 except that a polyethylene film having a thickness of 30 μm and a contact angle of 62° (PE30 trade name, made by Nitto Boseki Co., Ltd.) was used instead of the polyester film. Thus obtained noise absorbing material was measured on various properties thereof. The results are also shown in Table 1.

(Comparative Example 1)

A noise absorbing material was tried to be obtained in a similar way to that in the Example 1 except that the mold releasing paper was not used. However, a molten polyester film was adhered to a hot plate and the noise absorbing material was unable to be separated from the hot plate.

(Comparative Example 2)

A noise absorbing material was obtained in a similar way to that in the example 1 except that a polyamide film having a thickness of 30 μm and a contact angle of 51° (TP711 trade name, made by Nogawa Chemical Co.) was used instead of the polyester film. Thus obtained noise absorbing material was measured on various properties thereof. The results are also shown in Table 1.

(Comparative Example 3)

A noise absorbing material was obtained in a similar way to that in the example 1 except that a polyurethane film having a thickness of 30 μm and a contact angle of 43° (PU30 trade name, made by Nitto Boseki Co., Ltd.) was used instead of the polyester film. Thus obtained noise absorbing material was measured on various properties thereof. The results are also shown in Table 1.

(Example 3)

Noise absorbing materials were obtained in a similar way to that in the example 1 except that a fire retardant soft urethane foam having a thickness of 25 mm and a different gas permeability (VHZ) was used.

Figure 3:
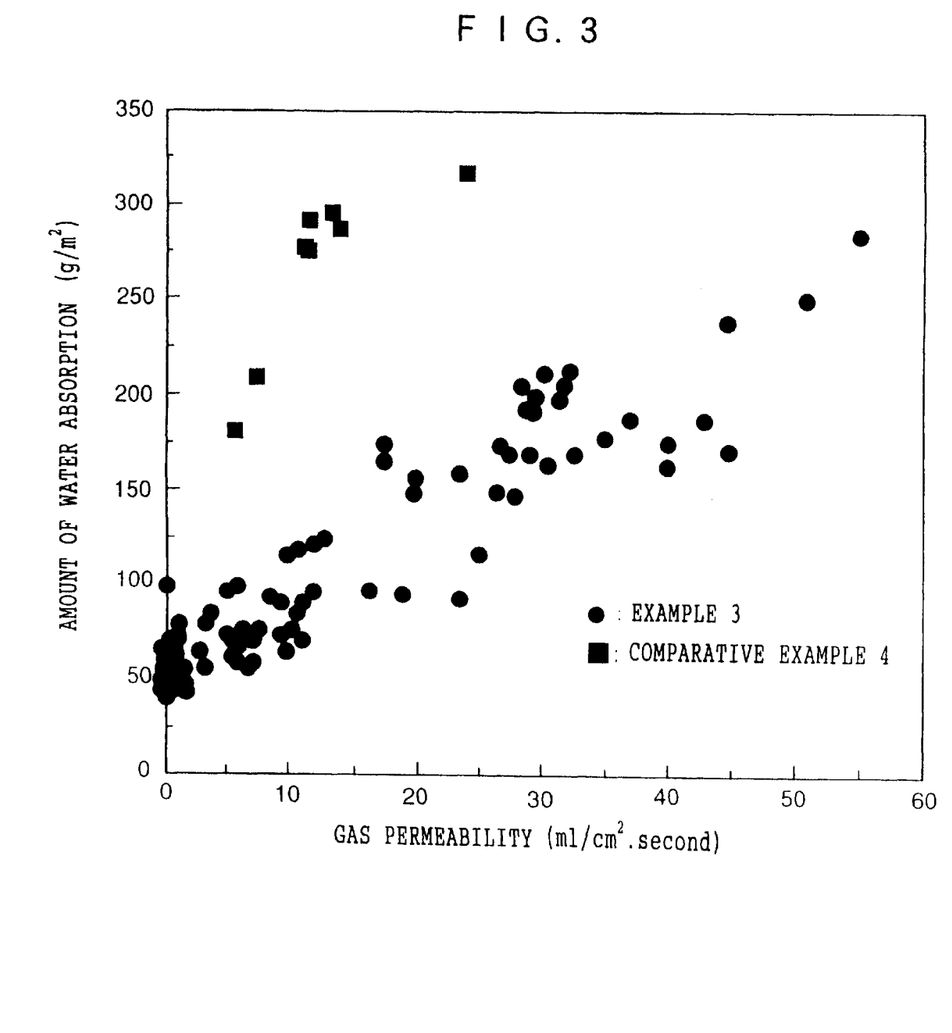
FIG. 3 is a graph showing a relation between the gas permeability and the amount of water absorption.

Thus obtained noise absorbing material was measured on the gas permeability, the amount of water absorption and a relation between both properties was plotted on a graph shown in FIG. 3.

(Comparative Example 4)

Commercial fire retardant soft urethane foams with urethane films each having a thickness of 25 mm and a different gas permeability (F4 trade mark, made by Inoyac Co.) were measured on gas permeability, the amount of water absorption and a relation between both properties was plotted on a graph shown in FIG. 3.

(Example 4)

Figure 4:
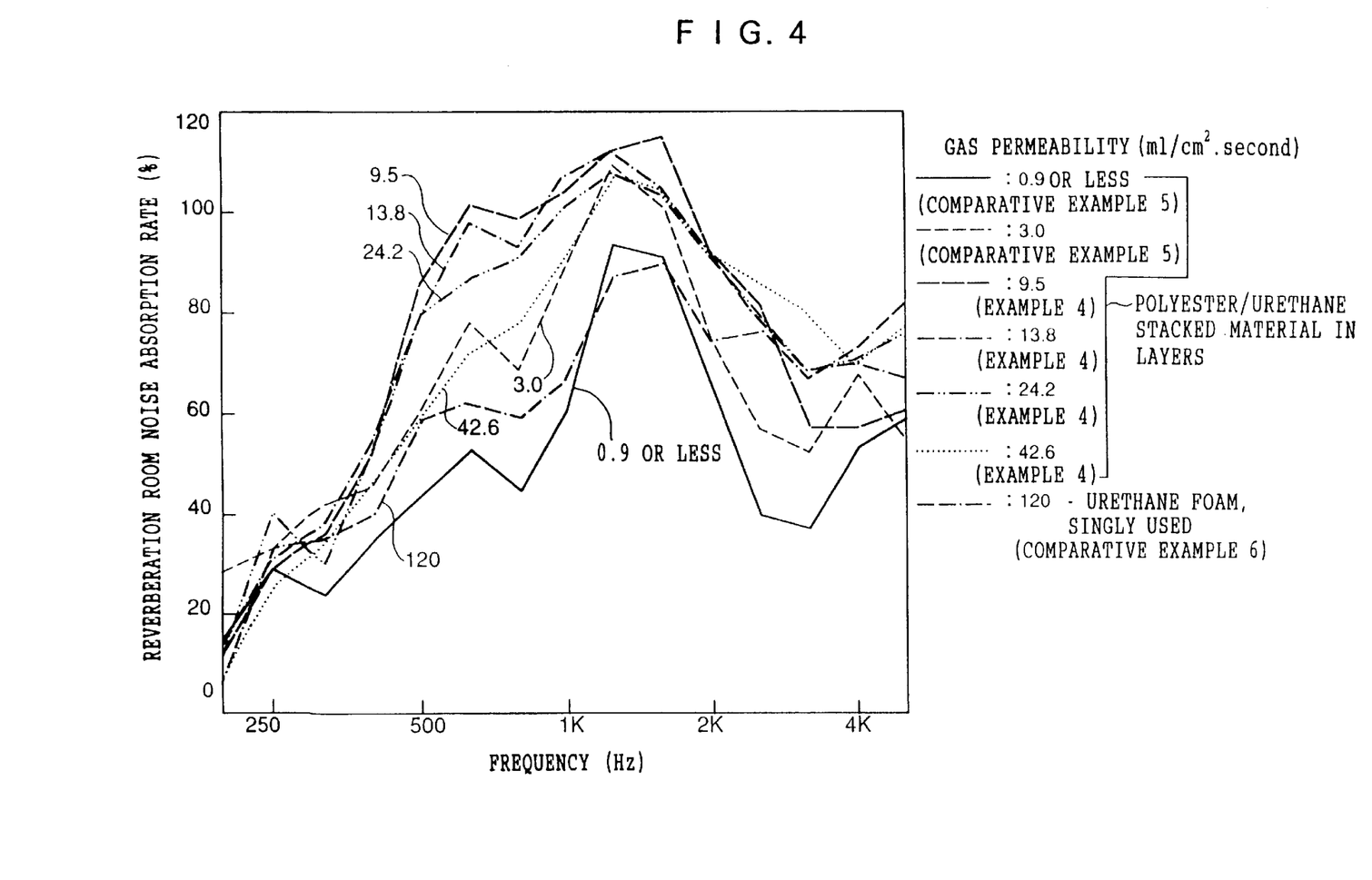
FIG. 4 is a graph showing relations between the gas permeability and noise absorption of noise absorbing materials at various frequencies.

Noise absorbing materials were obtained in a similar way to that in the Example 1 except that fire retardant soft urethane foams (VHZ) each having a thickness of 25 mm and polyester films (D2810) each having a thickness of 50 μm in each set were placed on a lower hot plate of a compression molding press which has upper and lower hot plates and heated at different temperatures of 120, 122, 127 and 129° C. As a result, noise absorbing materials respectively having gas permeabilities of 9.5, 13.8, 24.2 and 42.6 ml/cm²·sec. And noise absorption rate was measured over a broad range of frequency, as shown in FIG. 4.

(Comparative example 5)

Noise absorbing materials were obtained in a similar way to that in the example 4 except that fire retardant soft urethane foams (VHZ) were heated by the hot plates at temperatures of 110 and 115° C. As a result, noise absorbing materials respectively having gas permeabilities of 0.9 and 3.0 ml/cm²·sec and noise absorption rates were measured in a similar way to that in the Example 3, which are shown in FIG. 4.

(Comparative example 6)

Noise absorbing materials were obtained in a similar way to that in the example 4 except that a fire retardant soft urethane foam having a gas permeability of 120 mi/cm²·sec was singly used without usage of a film. Thus noise absorption rate was measured in a similar way to that in the Example 4, which are shown in FIG. 4.

(Example 5)

Fire retardant noise absorbing materials each with a reinforcing material were obtained in a similar way to that in the example 1 except that after a polyester film is stacked in a layered manner, a nylon tricot 15d as a reinforcing material of the film is further stacked thereon in a layered manner. Tear resistances were measured on thus obtained fire retardant noise absorbing materials and the noise absorbing material of the examples 1 and 5, and the results were 1.36 kgf/cm and 0.33 kgf/cm respectively.

Moreover, the noise absorbing materials of the example 5 were subjected to measurements on gas permeability, amount water absorption, flame resistance and noise absorption rate which results were the same as the corresponding values in the example 1.

example 5, tear resistance can be much strengthened if there is a necessity for it.

As can be seen in FIG. 4, it can be understood that if a claimed range of gas permeability of a noise absorbing material of the present invention is specifically set to be in the range of about 10 to 25 ml/cm$^3$·sec, the noise absorption is excellent in the range of a low to medium frequency. On the other hand, if gas permeability is set to fall outside the claimed range (less than 5 ml/cm$^2$·sec, the comparative example 5) the noise absorption is deteriorated. In a urethane foam without the film, which is singly used (the comparative example 6), the noise absorption is also not good.

TABLE 1

|  |  | Example | | Comparative example | |
|---|---|---|---|---|---|
|  |  | 1 | 2 | 2 | 3 |
| Material | Film | Polyester | Polyethylene | Polyamide | Polyurethane |
|  | Thickness ($\mu$m) | 30 | 30 | 30 | 30 |
|  | Contact angle (°) | 66 | 62 | 51 | 43 |
|  | Urethane foam | VHZ[1] | VHZ | VHZ | VHZ |
|  | Thickness (mm) | 25 | 25 | 25 | 25 |
| Characteristics of the | Gas permeability (ml/cm$^2$ · second) | 15 | 15 | 15 | 15 |
| noise absorbing | Amount of water absorption (g/m$^2$) | 100 | 110 | 200 | 300 |
| material | Flame resistance | self-extinguishing | self-extinguishing | delayed combustibility | delayed combustibility |
|  | Noise absorption rate (1 KHz) (%) | 100 | 100 | 100 | 100 |

[1]A fire retardant soft urethane foam (trade name, made by Bridgestone Co.)

As shown in the examples, it is clearly understood that according to the present invention, a fire retardant noise absorbing material, excellent in properties of water proof, flame resistance, noise absorption and improved on tear resistance if necessary, efficiently in an easy manner.

As seen from the comparative example 1, when a mold releasing paper is not used between a film and a hot plate, a molten film is adhered to the hot plate and thus a noise absorbing material cannot be separated from the hot plate. According to a method of the present invention, a noise absorbing material can be removed from the hot plate with ease and another noise absorbing material can be produced while hot plates continues to be heated without cooling the hot plates, so that productivity is remarkably increased with suppression of an energy loss.

In comparison between the examples 1, 2 which use a polyester film and a polyethylene film and the comparative examples 2, 3 which use other kinds of film, a fire retardant noise absorbing material of the present invention is excellent in properties of flame resistance and noise absorption and in addition, the fire retardant noise absorbing material is remarkably improved on property of water proof (a small amount of water absorption) despite gas permeabilities being made equal between the examples and comparative examples, which can be explained by the fact that a contact angle with water of a fire retardant noise absorbing material of the present invention is large (a large repellency to water). As can be shown in the example 3 (FIG. 3), a fire retardant noise absorbing material of the present invention has a correlation between gas permeability and amount of water absorption and thus amount of water absorption can be controlled by controlling gas permeability. Comparing the example 3 of FIG. 3 with the comparative example 4, it is found that a property of waterproof of the present invention is better over a broad range of gas permeability than that of the comparative example 4. Moreover, as shown in the A fire retardant noise absorbing material and a method of producing the same according to the present invention are constituted as mentioned above and thus the present invention has effects that a noise absorbing material is excellent in properties of water proof, fire resistance, noise absorption and improved on tear resistance if necessary and can be produced with a small energy loss in a short time in a simple and easy manner.

What is claimed is:

1. A fire retardant noise absorbing material comprising a fire retedardant soft urethane foam and a polyester film layer or a polyethylene film layer laminated by hot melting onto side of the urethane foam without a use of a hot-melt adhesive, wherein the gas permeability of a section of 10 mm in thickness from a surface of the film layer of the noise absorbing material is in the range of 9.5 to 25 ml/cm$^2$·sec.

2. A fire retardant noise absorbing material according to claim 1, wherein said film layer is a polyester film layer.

3. A fire retardant noise absorbing material according to claim 1, wherein a flexible resin fabric or a flexible resin nonwoven fabric having a gas permeability of 5 ml/cm$^2$·sec or more is laminated onto a surface of said polyester film layer or a surface of said polyethylene film layer.

4. A fire retardant noise absorbing material according to claim 3, wherein said resin fabric or nonwoven fabric is respectively a nylon fabric or a nylon nonwoven fabric.

5. A fire retardant noise absorbing material according to claim 1, wherein the thickness of said fire retardant soft urethane foam is in the range of 10 to 100 mm.

6. A method of producing a fire retardant noise absorbing material having a gas permeability of a section of 10 mm in thickness from a surface of a film layer in the range of 9.5 to 25 ml/cm$^2$·sec, comprising the steps of superposing the film on a fire retardant soft urethane foam; laminating a sheet of mold releasing paper thereon; heating while pressure is applied thereto from the side of the paper by means of a hot plate to affix the layer on the soft urethane foam by hot melting; remaining the laminated material from the hot plate in a heated conditions; and separating the sheet of mold releasing paper from the laminated material after the film layer has solidified, wherein said film layer is a polyester film layer or a polyethylene film layer which does not require a hot-melt adhesive.

7. A method of producing a fire retardant noise absorbing material according to claim 6, wherein said film layer is a polyester film.

8. A method of producing a fire retardant noise absorbing material according to claim 6, wherein the temperature of said heating while pressure is applied is higher than the melting point of the film by 30° C. or more.

9. A method of producing a fire retardant noise absorbing material according to claim 6, wherein the method further comprises the step of laminating a flexible resin fabric or a flexible resin nonwoven fabric having a gas permeability of 5 ml/cm$^2$·sec or more on the surface of the superposed film layer on said soft urethane foam.

10. A method of producing a fire retardant noise absorbing material according to claim 9, wherein said resin fabric or nonwoven fabric is respectively a nylon fabric or a nylon nonwoven fabric.

\* \* \* \* \*